(12) United States Patent
Fang et al.

(10) Patent No.: US 9,589,092 B2
(45) Date of Patent: Mar. 7, 2017

(54) METHOD FOR CO-DESIGNING FLIP-CHIP AND INTERPOSER

(71) Applicant: MediaTek Inc., Hsin-Chu (TW)

(72) Inventors: Jia-Wei Fang, Hsinchu (TW); Chi-Jih Shih, New Taipei (TW); Shen-Yu Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 50 days.

(21) Appl. No.: 14/546,238

(22) Filed: Nov. 18, 2014

(65) Prior Publication Data

US 2015/0154337 A1   Jun. 4, 2015

Related U.S. Application Data (60) Provisional application No. 61/911,021, filed on Dec. 3, 2013.

(51) Int. Cl.
*G06F 17/50*  (2006.01)
*H01L 23/00*  (2006.01)

(52) U.S. Cl.
CPC ...... *G06F 17/5072* (2013.01); *G06F 17/5077* (2013.01); *G06F 17/5081* (2013.01);
(Continued)

(58) Field of Classification Search
CPC ... H01L 2224/73204; H01L 2224/0612; H01L 2224/97; H01L 2224/73265; H01L 2924/15311; H01L 2224/81; H01L 2225/06517; H01L 2225/06513; H01L 2224/12105; H01L 24/06; H01L 2224/73203; H01L 2224/1412; H01L 24/14; G06F 17/5072; G06F 17/5077; G06F 2217/40; G06F 17/5081; G06F 2217/78

See application file for complete search history.

(56) References Cited

U.S. PATENT DOCUMENTS 5,060,116 A  *  10/1991  Grobman  ............  H01L 23/5382
                                                          174/254
5,251,097 A  *  10/1993  Simmons  ..............  G06F 13/409
                                                          361/679.53

(Continued)

OTHER PUBLICATIONS

Li et al.; "Development of an optimized power delivery system for 3D IC integration with TSV silicon interposer"; Year: 2012; Electronic Components and Technology Conference (ECTC), 2012 IEEE 62nd; pp. 678-682.*

(Continued)

*Primary Examiner* — Helen Rossoshek
(74) *Attorney, Agent, or Firm* — McClure, Qualey & Rodack, LLP (57) ABSTRACT

A method for co-designing a flip-chip and an interposer is provided. Information regarding I/O pads, power pins and IR constraints of the flip-chip is obtained. A bump planning procedure is performed to obtain a total number of micro bumps of the flip-chip according to the information, and obtain a minimum conductance of each of the power pins of the flip-chip according to a bump placement of the micro bumps of the flip-chip. A chip-interposer routing procedure is performed to obtain a Re-Distribution Layer (RDL) routing of the flip-chip and an interposer routing of the interposer according to the minimum conductance of the power pins of the flip-chip.

16 Claims, 13 Drawing Sheets

(52) U.S. Cl.
CPC ...... *G06F 2217/40* (2013.01); *G06F 2217/78* (2013.01); *H01L 24/06* (2013.01); *H01L 24/14* (2013.01); *H01L 2224/0612* (2013.01); *H01L 2224/1412* (2013.01); *H01L 2224/73204* (2013.01); *H01L 2224/81* (2013.01); *H01L 2224/97* (2013.01); *H01L 2225/06517* (2013.01); *H01L 2924/15311* (2013.01)

(56) References Cited

U.S. PATENT DOCUMENTS

| | | | | |
|---|---|---|---|---|
| 6,461,895 B1* | 10/2002 | Liang | G11C 7/02 | 257/E23.067 |
| 6,483,330 B1* | 11/2002 | Kline | G01R 31/2831 | 324/750.03 |
| 6,537,831 B1* | 3/2003 | Kline | H01L 22/20 | 257/E21.525 |
| 6,815,712 B1* | 11/2004 | Kline | H01L 22/20 | 257/48 |
| 6,875,921 B1* | 4/2005 | Conn | H01L 23/50 | 174/534 |
| 6,934,924 B2* | 8/2005 | Paul | G06F 17/5068 | 716/114 |
| 7,065,721 B2* | 6/2006 | Pekin | G06F 17/5068 | 716/119 |
| 7,173,330 B2* | 2/2007 | Eng | H01L 21/4857 | 257/700 |
| 7,566,960 B1* | 7/2009 | Conn | H01L 23/055 | 257/678 |
| 7,781,873 B2* | 8/2010 | Koh | H01L 23/4951 | 257/666 |
| 7,838,975 B2* | 11/2010 | Chen | H01L 24/19 | 257/676 |
| 8,014,166 B2* | 9/2011 | Yazdani | H01L 23/481 | 361/790 |
| 8,901,750 B2* | 12/2014 | Park | H01L 23/535 | 257/686 |
| 9,165,877 B2* | 10/2015 | Chen | H01L 23/3135 | |
| 2003/0102159 A1* | 6/2003 | Loo | H01L 23/49822 | 174/262 |
| 2007/0229110 A1* | 10/2007 | Anazawa | G01R 31/31721 | 324/764.01 |
| 2007/0231953 A1* | 10/2007 | Tomita | H01L 21/4867 | 438/106 |
| 2010/0058580 A1* | 3/2010 | Yazdani | H01L 23/481 | 29/740 |
| 2010/0117217 A1* | 5/2010 | Park | H01L 23/49575 | 257/692 |
| 2010/0213600 A1* | 8/2010 | Lau | H01L 23/055 | 257/693 |
| 2010/0327457 A1* | 12/2010 | Mabuchi | H01L 23/50 | 257/773 |
| 2011/0107283 A1* | 5/2011 | Oh | G06F 17/5068 | 716/107 |
| 2011/0278737 A1* | 11/2011 | Yazdani | H01L 23/481 | 257/774 |
| 2012/0153466 A1* | 6/2012 | Chew | H01L 23/5386 | 257/737 |
| 2012/0211885 A1* | 8/2012 | Choi | H01L 23/3128 | 257/737 |
| 2012/0228760 A1* | 9/2012 | Lim | H01L 23/60 | 257/737 |
| 2013/0058067 A1* | 3/2013 | Yee | H01L 23/36 | 361/820 |
| 2013/0258627 A1* | 10/2013 | Guo | H01L 23/147 | 361/782 |
| 2014/0266152 A1* | 9/2014 | Huang | G01R 31/31708 | 324/76.11 |
| 2014/0289693 A1* | 9/2014 | Koduri | G06F 17/5077 | 716/129 |
| 2015/0097277 A1* | 4/2015 | Chen | H01L 23/3135 | 257/668 |
| 2015/0171039 A1* | 6/2015 | Cheng | H01L 23/488 | 257/737 |

OTHER PUBLICATIONS

Banijamali et al.; "Outstanding and innovative reliability study of 3D TSV interposer and fine pitch solder micro-bumps"; Year: 2012; Electronic Components and Technology Conference (ECTC), 2012 IEEE 62nd; pp. 309-314, DOI:.*

Fang et al.; "Area-I/O Flip-Chip Routing for Chip-Package Co-Design Considering Signal Skews"; Year: 2010; IEEE Transactions on Computer-Aided Design of Integrated Circuits and Systems; vol. 29, Issue: 5.*

Ho, Y.K., et al.; "Multiple Chip Planning for Chip-Interposer Codesign;" May 2013; pp. 1-6.

* cited by examiner

METHOD FOR CO-DESIGNING FLIP-CHIP AND INTERPOSER

CROSS REFERENCE TO RELATED APPLICATIONS

This Application claims priority of U.S. Provisional Application No. 61/911,021, filed on Dec. 3, 2013, the entirety of which is incorporated by reference herein.

BACKGROUND OF THE INVENTION

Field of the Invention

The invention relates to a method for co-designing flip-chips and an interposer, and more particularly to a method for co-designing flip-chips and an interposer to minimize total wire-length and prevent IR violations.

Description of the Related Art

As technology advances, interposer-based three-dimensional integrated circuits (interposer-based 3D ICs, also known as 2.5D ICs) are becoming one of the most promising solutions for enhancing system performance, decreasing power consumption, and supporting heterogeneous integration.

A silicon interposer is not a specific package type, like System in Package (SiP) or Package on Package (PoP). The interposer functions as a larger die to be the carrier of multiple dies. Interposer-based technology is used to connect multiple dies on an interposer and then mount the interposer on a package. In general, the interposer-based technology is a major choice in high-speed applications because of the following advantages: reduced signal lengths, heterogeneous integration, increased process yield against SoC (System on Chip), etc. To enhance these advantages, I/O pads are not only placed along a die boundary (i.e. peripheral-I/O flip-chips), but also in the whole area of the die (i.e. area-I/O flip-chips).

In a conventional design flow, flip-chips are often designed independently, then placed on a silicon interposer, and finally routed with inter-chip connections on the Re-Distribution Layer (RDL) of the interposer. This conventional flow might incur interposer-unfriendly micro bump assignments, and thus requires considerable extra efforts for inter-chip routing, such as IR drops.

Therefore, it is desirable to simultaneously consider a silicon interposer and multiple flip-chips mounted on the silicon interposer.

BRIEF SUMMARY OF THE INVENTION

Methods for co-designing a plurality of flip-chips and an interposer are provided. An embodiment of a method for co-designing a flip-chip and an interposer is provided. Information regarding I/O pads, power pins and IR constraints of the flip-chip is obtained. A bump planning procedure is performed to obtain a total number of micro bumps of the flip-chip according to the information, and obtain a minimum conductance of each of the power pins of the flip-chip according to a bump placement of the micro bumps of the flip-chip. A chip-interposer routing procedure is performed to obtain a Re-Distribution Layer (RDL) routing of the flip-chip and an interposer routing of the interposer according to the minimum conductance of the power pins of the flip-chip.

Furthermore, another embodiment of a method for co-designing a flip-chip and an interposer is provided. Information regarding I/O pads, power pins and IR constraints of the flip-chip is obtained. A bump planning procedure is performed to obtain a minimum number of power bumps of the flip-chip corresponding to the power pins of the flip-chip according to the information, and uniform power density of the power bumps of the flip-chip to obtain a minimum conductance of each of the power pins of the flip-chip and a bump placement of the micro bumps of the flip-chip. A chip-interposer routing procedure is performed to obtain a flow network according to the minimum conductance of the power pins and the bump placement, and obtain a Re-Distribution Layer (RDL) routing of the flip-chip and an interposer routing of the interposer according to the flow network.

Moreover, an embodiment of a method for co-designing a plurality of flip-chips and an interposer is provided. Information regarding I/O pads, power pins and IR constraints of each of the flip-chips is obtained. A minimum number of power bumps of each of the flip-chips is obtained according to the corresponding information, respectively. Power density of the power bumps of each of the flip-chips is uniformed to respectively obtain a minimum conductance of each of the power pins of the corresponding flip-chip and a bump placement of the micro bumps of the corresponding flip-chip. A flow network is constructed according to the minimum conductance of the power pins of each of the flip-chips, respectively. A bump assignment of the power bumps of each of the flip-chips is obtained according to all of the flow networks, respectively. A Re-Distribution Layer (RDL) routing of each of the flip-chips is obtained according to the corresponding bump assignment, respectively. An interposer routing of the interposer is obtained according to all of the RDL routings.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
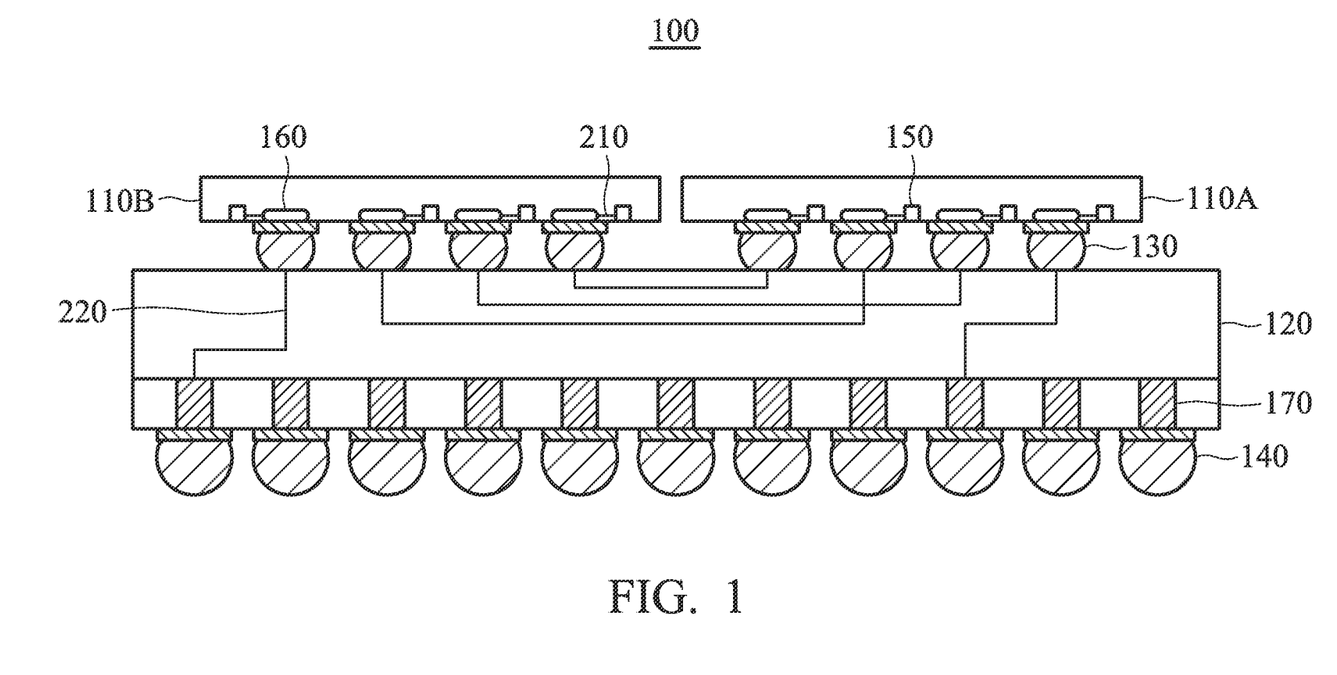
FIG. 1 shows a chip-interposer structure.
Figure 2:
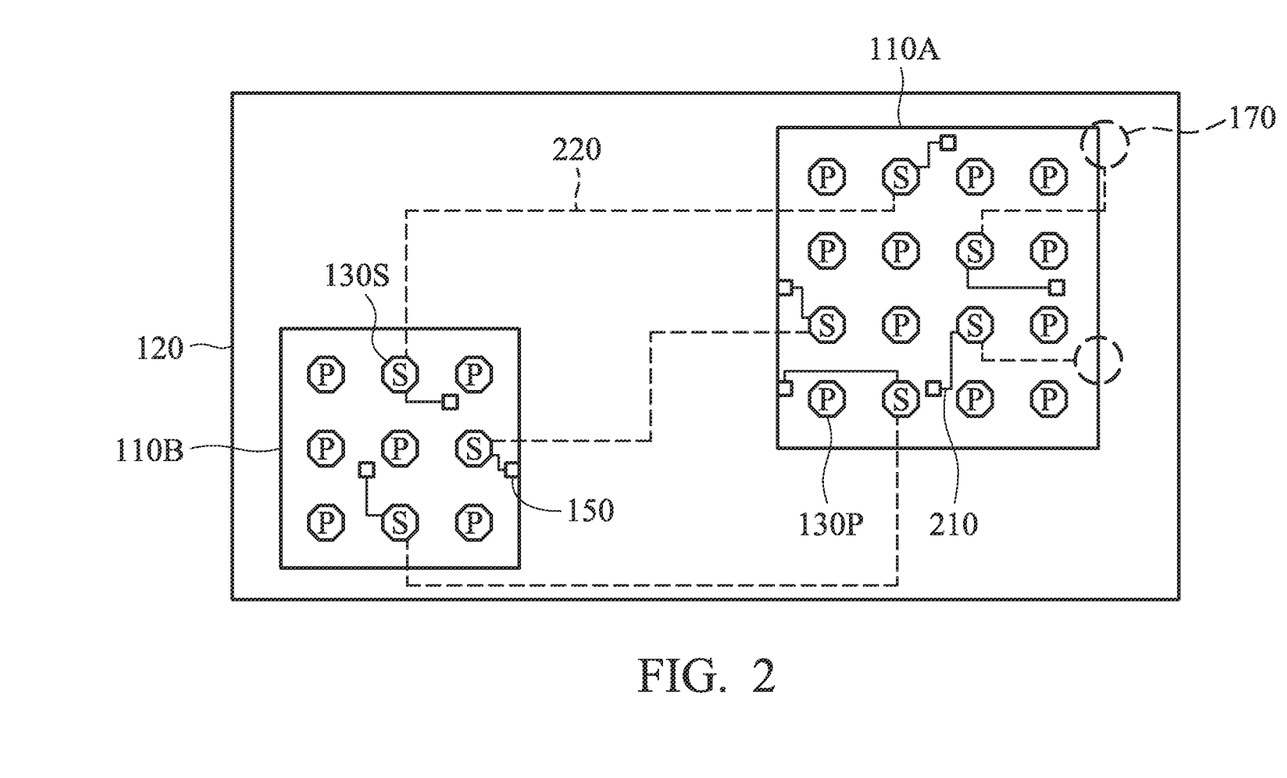
FIG. 2 shows a top view illustrating a routing diagram of the chip-interposer structure.

FIG. 1 shows a chip-interposer structure 100, and FIG. 2 shows a top view illustrating a routing diagram of the chip-interposer structure 100 of FIG. 1. The chip-interposer structure 100 comprises two flip-chips 110A and 1106, an interposer 120, a plurality of micro bumps 130 and a plurality of Controlled Collapse Chip Connection (C4) bumps 140. The flip-chips 110A and 1106 are connected to the interposer 120 via the micro bumps 130, and the flip-chips 110A and 1106 and the interposer 120 can be mounted on a package via the C4 bumps 140. In FIG. 1, the chip-interposer routing can be divided into two sections: (1) RDL (Re-Distribution Layer) routing 210 between the pads/pins 150 and the micro bumps 130 of each flip-chip via the bump pads 160 and (2) interposer routing 220 between the micro bumps 130 of the flip-chips 110A and 1106 and the C4 bumps 140 via Through Silicon Vias (TSVs). In general, every flip-chip on an interposer needs to plan micro bumps for both RDL routing 210 and power supply. The placed pads/pins 150 are redistributed to the micro bumps 130 by using a single RDL. Then the interposer routing 220 is applied to connect each micro bump 130 to other micro bumps 130 or TSVs 170. In addition to multiple-chip placement, micro-bump planning not only affects chip-interposer routing, but also IR drops. For example, redundant routing will detour in the chip-interposer routing, and the pads/pins 150 are placed in the whole area of the chip. Therefore, for the micro bumps 130, the signal bumps 130S have to be mixed with the power bumps 130P and result in additional IR drops.

Figure 3:
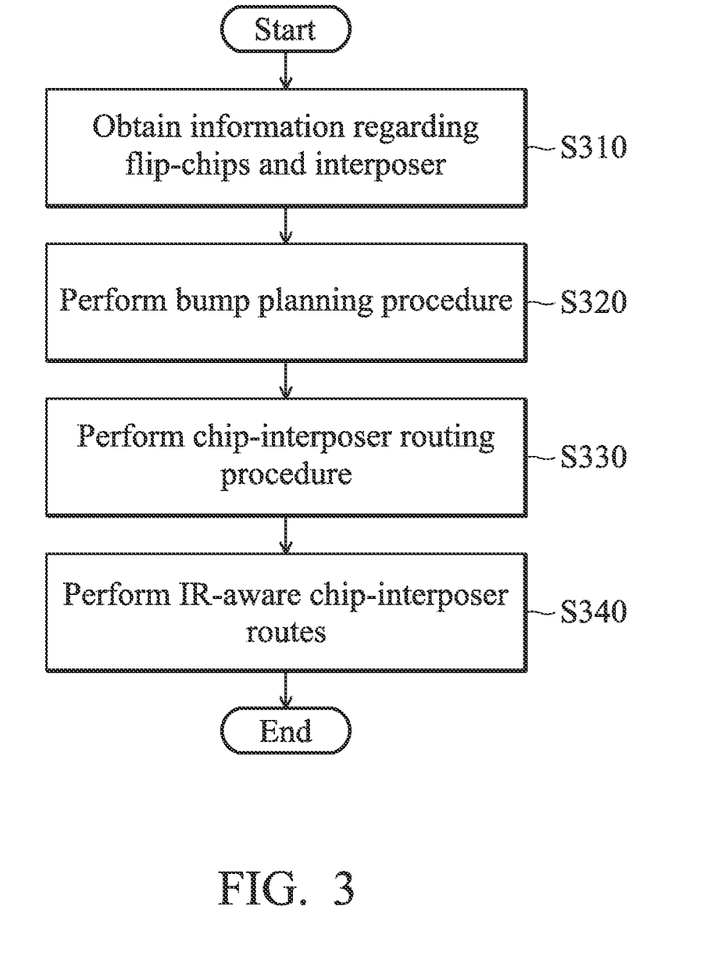
FIG. 3 shows a method 300 for co-designing multiple flip-chips and an interposer according to an embodiment of the invention, wherein the method of FIG. 3 is performed by a processor capable of performing an electronic design automation (EDA) tool.

FIG. 3 shows a method 300 for co-designing multiple flip-chips and an interposer according to an embodiment of the invention, wherein the method of FIG. 3 is performed by a processor capable of operating an electronic design automation (EDA) tool. First, in step S310, the processor obtains information regarding the flip-chips, such as signal pads, power pins, power consumption, IR constrains, design rules of wires and micro bumps, and information regarding the interposer, such as design rules or wires, bumps and TSVs. Next, in step S320, for each flip-chip, the processor performs a bump planning procedure on the flip-chip according to the information obtained in step S310, so as to obtain a bump placement for the micro bumps of the flip-chip, wherein each power bump of the flip-chip has uniform power density in the bump placement. In the flip-chip, the power bumps are the micro bumps connected to the power pins, and the signal bumps are the micro bumps connected to the I/O pads. Furthermore, the minimum conductance of each power pad is obtained in the bump planning procedure. Next, in step S330, the processor performs a chip-interposer routing procedure according to the bump placement of each flip-chip, so as to obtain the IR-aware RDL routing of each flip-chip and the IR-aware interposer routing of the interposer. Next, in step S340, the processor performs IR-aware chip-interposer routes procedure to apply a maze routing to the interposer routing according to the RDL routing, so as to ensure that all wires can be routed without wire congestion. Thus, the total wire-length is minimized and IR violations are prevented.

Figure 4:
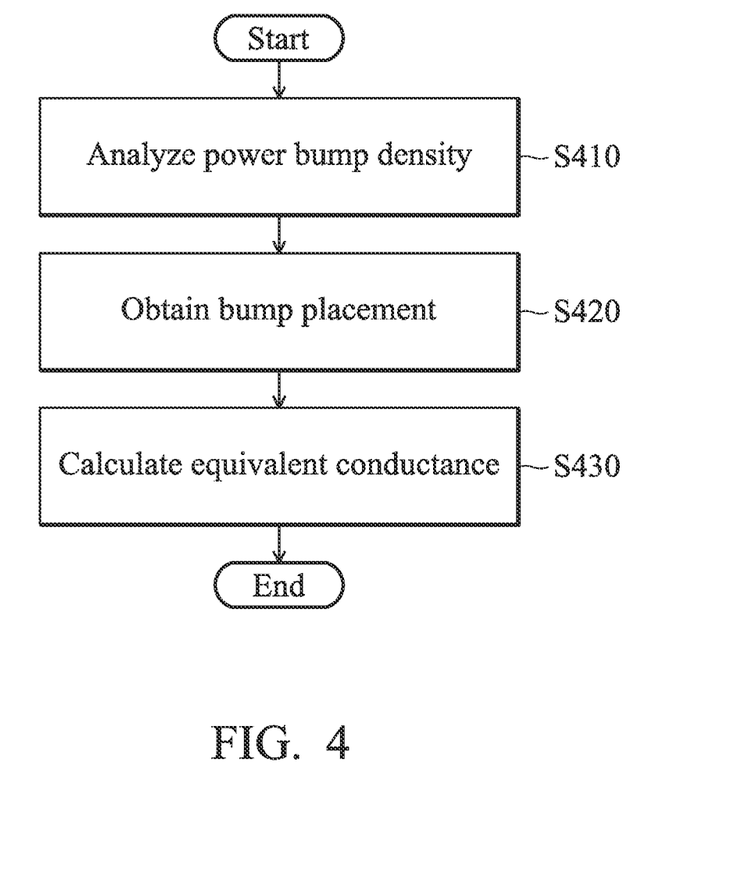
FIG. 4 shows a flowchart illustrating the bump planning procedure of FIG. 3 according to an embodiment of the invention.

FIG. 4 shows a flowchart illustrating the bump planning procedure of FIG. 3 according to an embodiment of the invention. First, in step S410, the processor analyzes a power bump density for each flip-chip, to estimate the minimum number of the power bumps for each flip-chip. In the example, it is assumed that the power density and power mesh are uniform in each block for clearer explanation, and multiple power densities and their power meshes can be handled separately. Considering the routability, the metal density of each block is also fixed for each metal layer. Because the micro bumps of the flip-chip cannot be placed on the die boundary of the flip-chip, the processor can calculate the minimum number of power bumps according to the following equation (1):

$$\frac{p}{4 \times V \times \delta} \times \sum_{i \in M} \frac{1}{M(i) \times G(i)} = \left(\frac{L_d}{lp} + 1\right) \times \left(\frac{W_d}{lp} + 1\right), \quad (1)$$

where the factor of 4 models that each bump in a tile supplies 25% power. For each flip-chip, in the equation (1), p represents the power of the flip-chip; V represents the supply voltage of the flip-chip; δ represents the limitation of maximum IR drop; M represents the total number of metal layers; M(i) represents the metal density of $i^{th}$ layer; G(i) represents the unit conductance in the $i^{th}$ metal layer; $L_d$ represents the die length of the flip-chip; $W_d$ represents the die width of the flip-chip; and lp represents the bump pitch. After solving lp, the processor can obtain the minimum number $B_{min}$ of power bumps according to the following equation (2):

$$|B_{min}| = \frac{L_d}{lp} \times \frac{W_d}{lp}. \quad (2)$$

Next, in step S420, the processor can perform a static IR analysis according to the minimum number $B_{min}$ to determine the total number $B_{total}$ of micro bumps, so as to obtain the bump placement of the flip-chip. For example, signal bumps and power bumps are combined together to determine the total number of micro bumps. According to the ratio of the die width $W_d$ and the die length $L_d$, an array with the minimum size that can cover the total number of micro bumps is obtained as the bump placement. It should be noted that the total number $B_{total}$ of micro bumps is always greater than the sum of the signal bumps and power bumps. Furthermore, in the bump placement, all of the micro bumps are placed uniformly to meet IR constraints. Next, in step S430, the processor calculates the equivalent conductance for each power pad of the flip-chip according to the power bump density analysis obtained in step S410 and the bump placement obtained in step S420, so as to obtain the minimum conductance of each power pad.

Figure 5:
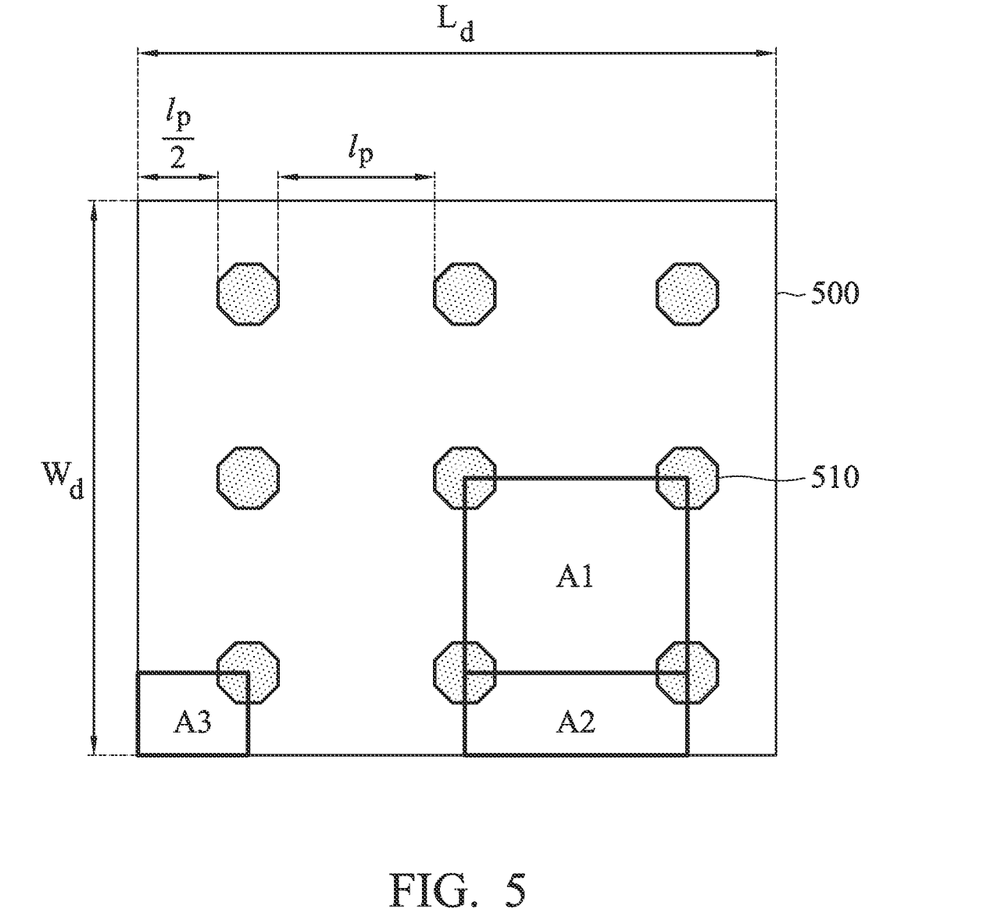
FIG. 5 shows an exemplary schematic illustrating a power bump density analysis according to a minimum number requirement for power bumps on a flip-chip.

FIG. 5 shows an exemplary schematic illustrating a power bump density analysis according to a minimum number requirement of power bumps 510 of a flip-chip 500. In the embodiment, the distance between the die boundary of the flip-chip 500 and an adjacent micro bump is equal to a half of the bump pitch $$\left(\text{e.g.} \frac{lp}{2}\right).$$

All micro bumps 510 are placed uniformly in the flip-chip 500 to maximize the equivalent conductance (i.e. lower IR drops). There are three kinds of bump regions in the embodiment. According to the fixed power density, the power in each region is proportional to its area. First, at the center of the flip-chip 500, four power bumps 510 form a region A1. Second, on the die boundary of the flip-chip 500, two adjacent power bumps 510 form a region A2 that has 50% power of the region A1. Third, at every die corner of the flip-chip 500, only one power bump 510 forms a region A3 that has 25% power of the region A1. Because of the uniform bump placement and the uniform power density, each power bump 510 has the same and maximum current. In the region A1, the IR drop at the center of the flip-chip 500 is worse because of the greatest distance to the nearest power bump 510. Consequently, the processor may determine that the minimum conductance occurs at the center. In the regions A2 and A3, the largest IR drop also occurs at the farthest point from the micro bumps 510.

Figure 6:
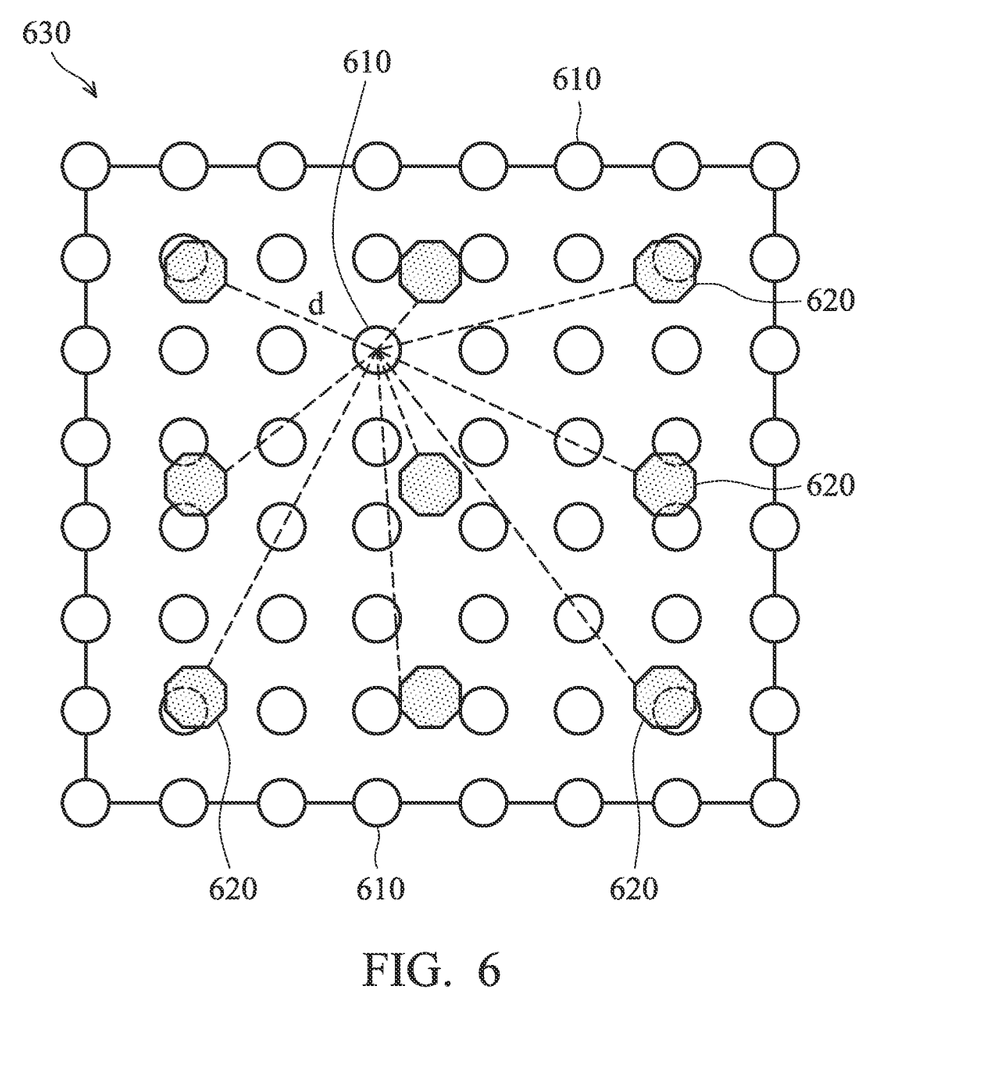
FIG. 6 shows an exemplary schematic illustrating the distance between a power pin and a plurality of micro bumps in a flip-chip.

FIG. 6 shows an exemplary schematic illustrating the distance between a power pin 610 and a plurality of micro bumps 620 in a flip-chip 630. In FIG. 6, the IR drop of each power pin 610 is calculated by an equivalent conductance $G_k$ and current. According to the bump placement, each power pin 610 will draw a fixed current. Because of the uniform current distribution and the fixed metal density, the equivalent conductance $G_k$ can be calculated according to the distances between a power pin 610 and the micro bumps 620, as shown in the following equation (3):

$$G_k = \sum_{i \in B} \frac{1}{d_{i,k}}, \forall k \in O, \quad (3)$$

where $d_{i,k}$ represents the distance between the $k^{th}$ power pin and the $i^{th}$ micro bump. For each power pin 610, the conductance between the power pin 610 and micro bumps 620 are similar. When the power pin 610 is close to the micro bumps 620, the equivalent conductance will increase. By using the minimum number $B_{min}$ of power bumps, the processor can obtain the minimum conductance $m_k$ of every power pin according to the following equation (4):

$$m_k = \sum_{i \in B_{min}} \frac{1}{d_{i,k}}, \forall k \in O. \quad (4)$$

If the conductance of the power pin 610 is smaller than the minimum conductance $m_k$, the processor can determine that an IR violation occurs. After obtaining the bump placement, the total number $B_{total}$ of micro bumps is larger than the minimum number $B_{min}$. Therefore, the equivalent conductance $G_k$ of a power pin of the flip-chip must be larger than the minimum conductance $m_k$, thereby decreasing the IR drop. Furthermore, the equivalent conductance $G_k$ is reduced due to the increased signal bumps when the processor assigns the signal bumps to the bump placement. For each power pin 610, the equivalent conductance $G_k$ is larger than the minimum conductance $m_k$ (e.g. $G_k \geq \alpha \times m_k$), where $\alpha$ represents a predetermined parameter for enhancing the correlation between the equations and the EDA tool. In the embodiment, the default value of $\alpha$ is 1. Consequently, the processor can obtain the IR-aware signal-bump assignment, and the conductance of every power pin 610 is larger than the minimum conductance $m_k$.

Figure 7:
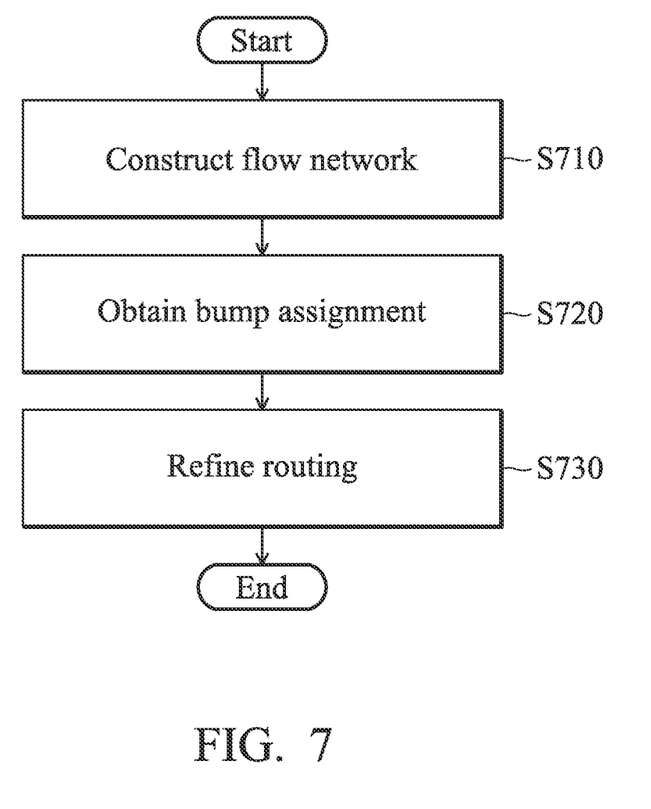
FIG. 7 shows a flowchart illustrating the chip-interposer routing procedure of FIG. 3 according to an embodiment of the invention.

FIG. 7 shows a flowchart illustrating the chip-interposer routing procedure of FIG. 3 according to an embodiment of the invention. First, in step S710, the processor constructs a flow network according to the minimum conductance $m_k$, to obtain the RDL routing of each flip-chip. Next, in step S720, the processor models the IR constraints with the flow network, to obtain the bump assignment without an IR violation, wherein the bump assignment comprises the signal-bump assignment corresponding to the I/O pads of the flip-chip and the power-bump assignment corresponding to the power pins of the flip-chip. Simultaneously, the processor obtains the interposer routing according to the bump assignment. Next, in step S730, the processor refines the routing paths of the flip-chip routing and the interposer routing with channel routing and maze routing, thus the final routing has nets which use the minimum total wire-length and which can meet the IR constraints.

Figure 8A:
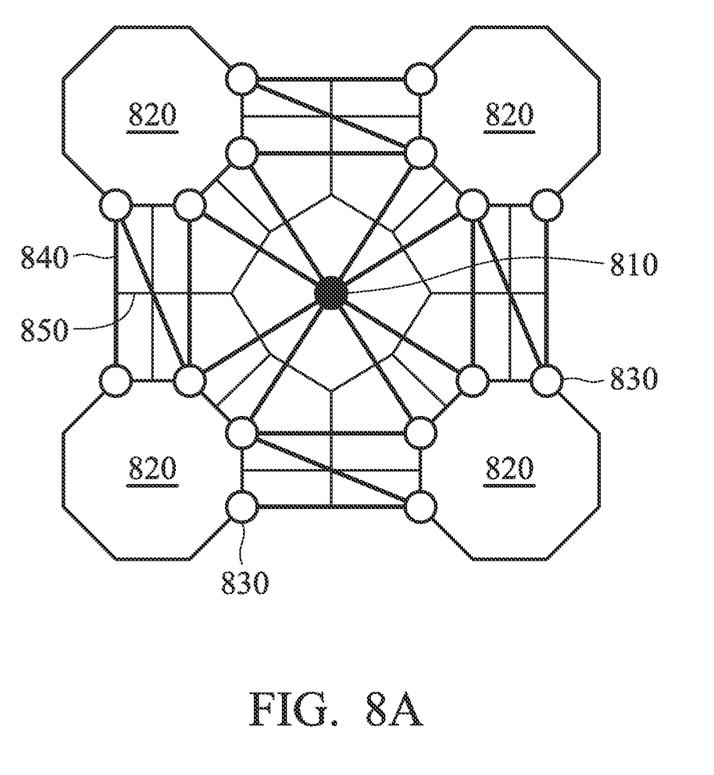
FIGS. 8A and 8B show an exemplary schematic illustrating how to construct a flow network to perform the concurrent assignment and routing for the flip-chips.
Figure 8B:
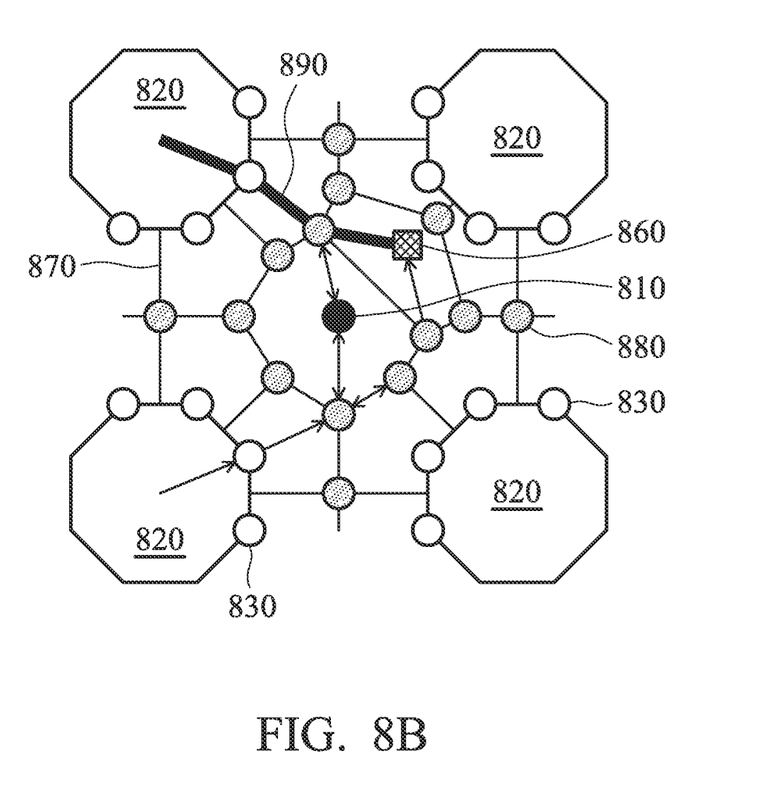

FIGS. 8A and 8B show an exemplary schematic illustrating how to construct a flow network F to perform the concurrent assignment and routing for the flip-chips. In FIG. 8A (for better illustration, only a tile is shown), an RDL node 810 represents a candidate node of a net to pass through a tile. In the embodiment, every micro bump 820 is an octagon and may have eight bump nodes 830 around it. According to the RDL node 810 and the bump nodes 830, the processor can obtain the corresponding Delaunay Triangulation (DT) 840 and its dual Voronoi Diagram (VD) 850. In the embodiment, the processor can use the bump nodes 830 to avoid an edge crossing in the micro bumps 820. Furthermore, the processor can use the RDL node 810 to cover the diagonal routing congestion. In FIG. 8B, the processor inserts an I/O pad 860, and then the resulted VD and its corresponding edges can model both the diagonal routing congestion and the area-I/O pads. Next, the processor inserts a plurality of VD nodes 880 at each crossing of VD edges 870. Thus, according to the VD, the processor can construct a routing network F for each flip-chip according to the following equation (5):

$$F = (P \cup Q \cup Z \cup U \cup B \cup \{s,t\} \subseteq T, E) \quad (5),$$

where Z represents the RDL nodes 810, U represents the bump nodes 830, and Q represents the VD nodes 880. Furthermore, T represents the node set, E represents the edge set, s represents the source node, and t represents the sink node. It is to be noted that none of E crosses each other, thus preventing wire crossings. Moreover, there are eight types of edges: (1) directed edge from a micro bump to an adjacent bump node; (2) directed edge from a bump node to an adjacent VD node; (3) directed edge from a VD node to an adjacent RDL node; (4) directed edge from an RDL node to an adjacent VD node; (5) directed edge from a VD node to an adjacent VD node; (6) directed edge from a VD node to an adjacent I/O pad; (7) directed edge from the source node to a micro bump; and (8) directed edge from an I/O pad to the sink node. Thus, the processor can obtain the routing result 890 of the I/O pad 860. In order to get the minimum total wire-length in the routing network, the processor can apply Linear Programming (LP) to solve the RDL routing problem, so as to minimize the total wire-length under the 100% routability. For example, the flow summation of the output side of a node is equal to that of the input side for flow conservation. Furthermore, at least one edge of every I/O pad 860 is chosen. Moreover, one wire is only connected to the micro bump 820 or the RDL node 810. In addition, the maximum number of wires passing through an edge is limited to avoid routing congestion. Thus, the processor can obtain the global routes in every flip-chip, wherein the global route have the minimum global-routing wire-length, and no wire crossing and no diagonal routing congestion occur. Furthermore, in order to prevent IR violations during routing, the IR constraints are modelled with the flow network F. According to the minimum conductance $m_k$ of every power pin, the bump assignment has to make the resulting conductance larger than or equal to the minimum one. Otherwise, the IR drop of a power pin will exceed the IR constraint because of $\Delta V=I/m_k$. If the signal-bump assignment is not IR-aware, some power pins will not have enough micro bumps to increase conductance and thus result in IR violations.

Figure 9:
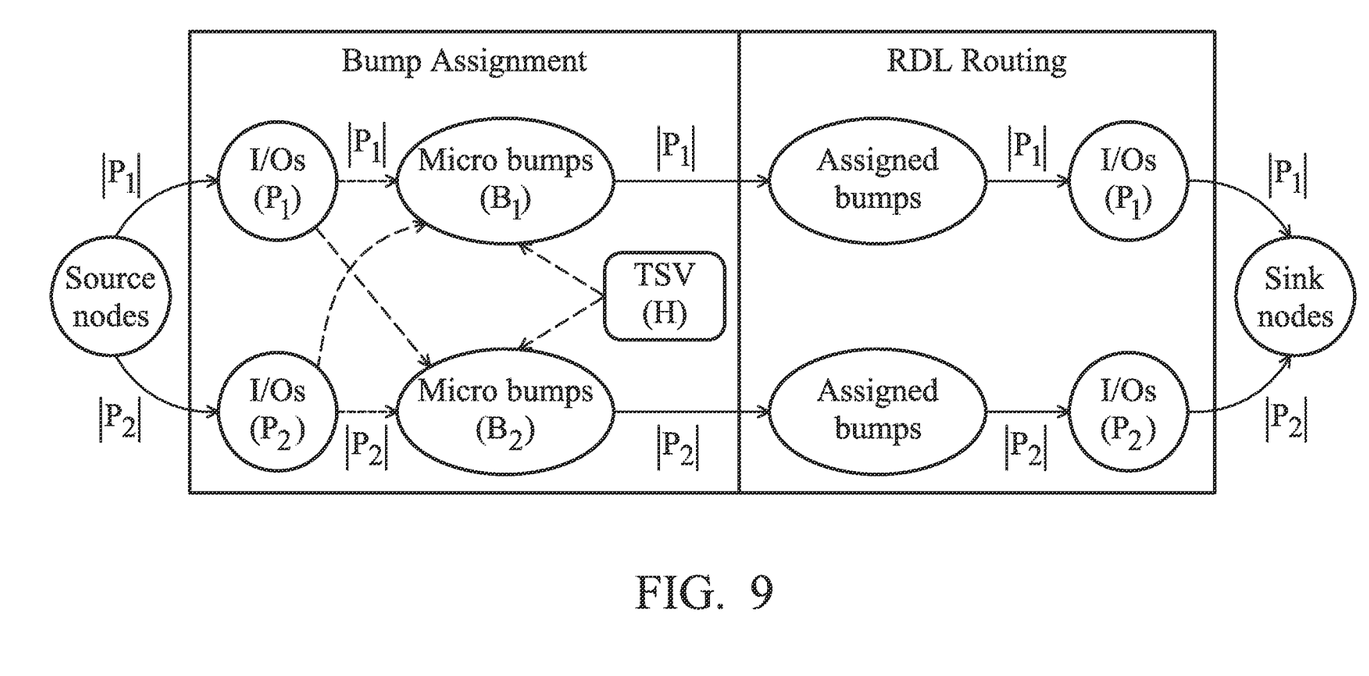
FIG. 9 shows a prototype illustrating a complete routing network between two flip-chips on an interposer.

In general, the interposer is an independent die used to connect the flip-chips. Since the interposer routing can apply the classic chip routing (e.g. from metal 1 to top metal), it is important to assign signal bumps to avoid routing detours. FIG. 9 shows a prototype illustrating a complete routing network between two flip-chips on an interposer according to an embodiment of the invention. In the embodiment, the processor will consider the bump assignment for reducing the total wire-length in the interposer routing. In the embodiment, the processor can use the Integer Linear Programming (ILP) formulation to solve the routing problem between the two flip-chips and the interposer. Furthermore, the processor can ensure that a micro bump is only assigned to one I/O pad, and will assign a closer micro bump to an I/O pad by considering the distance in the interposer routing. Consequently, the RDL routing can still use the result of the bump assignment to route to I/O pads when no routing congestion or wire crossing occurs. On the other hand, the RDL routing may change the bump assignment again for solving routing congestion and wire crossings, so as to reduce the routing length in the interposer. Thus, the processor can complete the RDL routing and the micro-bump assignment to minimize the total wire-length and prevent IR violations. For example, the processor may obtain the bump assignment of the micro bumps of each flip-chip according to the I/O pads of whole flip-chips. As shown in FIG. 9, the bump assignment of the micro bumps $B_1$ of the first flip-chip is obtained according to the I/O pads $P_1$ of the first flip-chip and the I/O pads $P_2$ of the first flip-chip. Similarly, the bump assignment of the micro bumps $B_2$ of the second flip-chip is obtained according to the I/O pads $P_1$ of the first flip-chip and the I/O pads $P_2$ of the first flip-chip. If it is determined that routing congestion and wire crossings occur, the processor will change the bump assignment again to re-obtain the RDL routing.

Figure 10A:
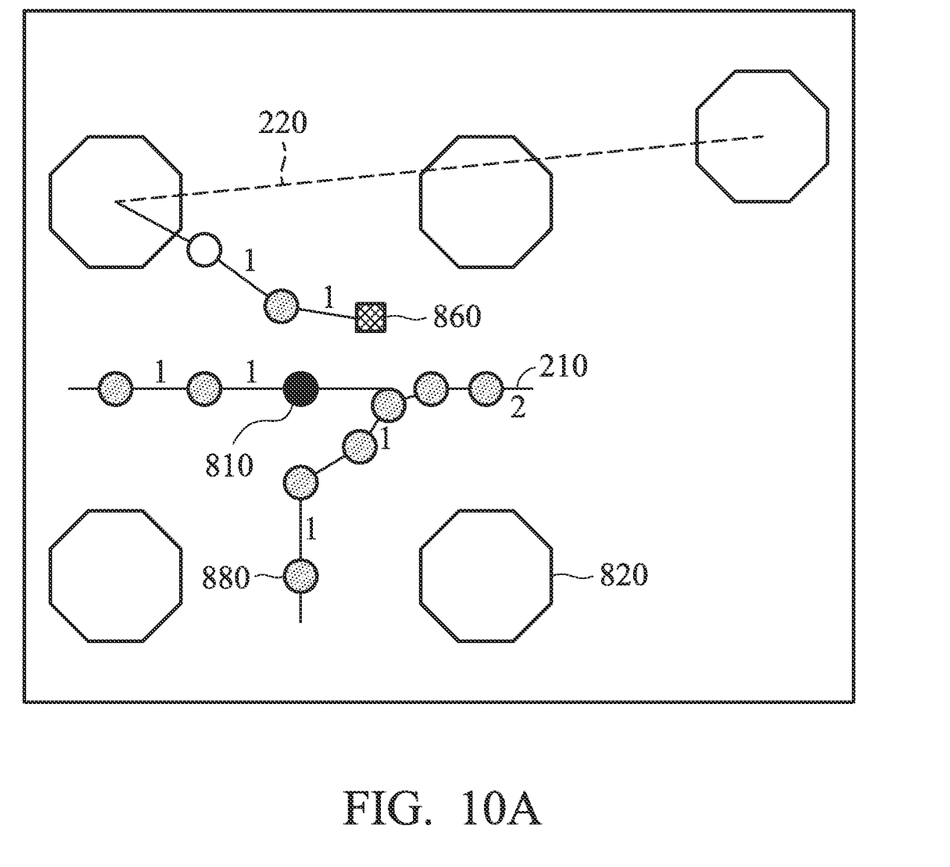
FIGS. 10A-10C shows a schematic illustrating a routing path refinement performed in step S730 of FIG. 7.
Figure 10B:
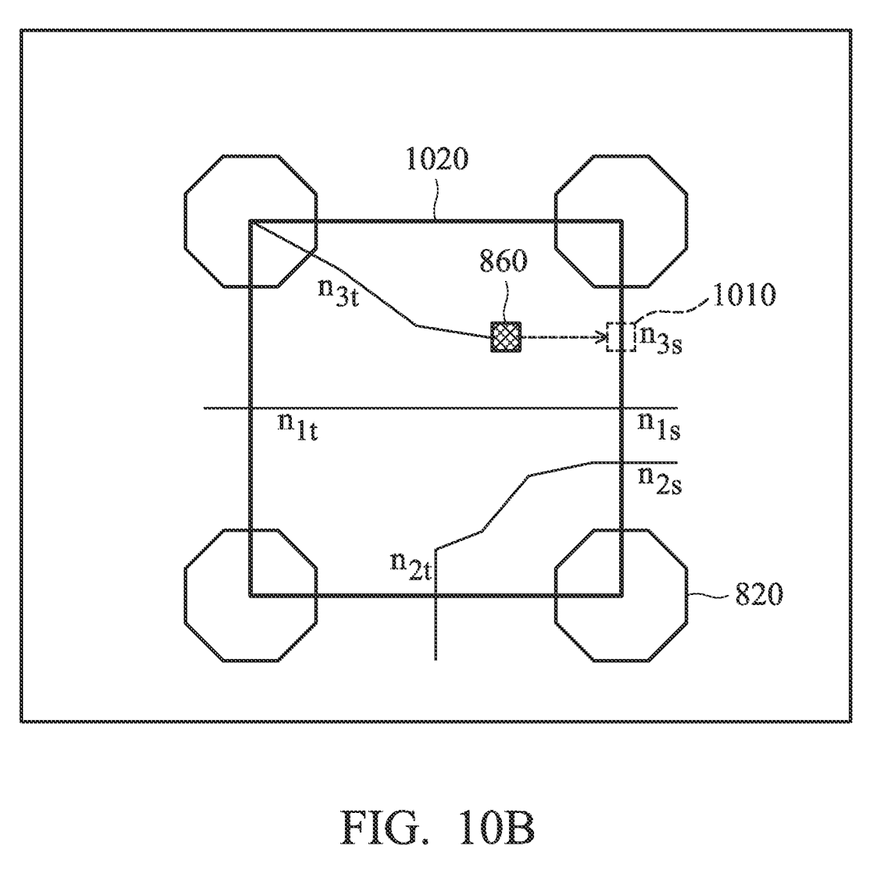
Figure 10C:
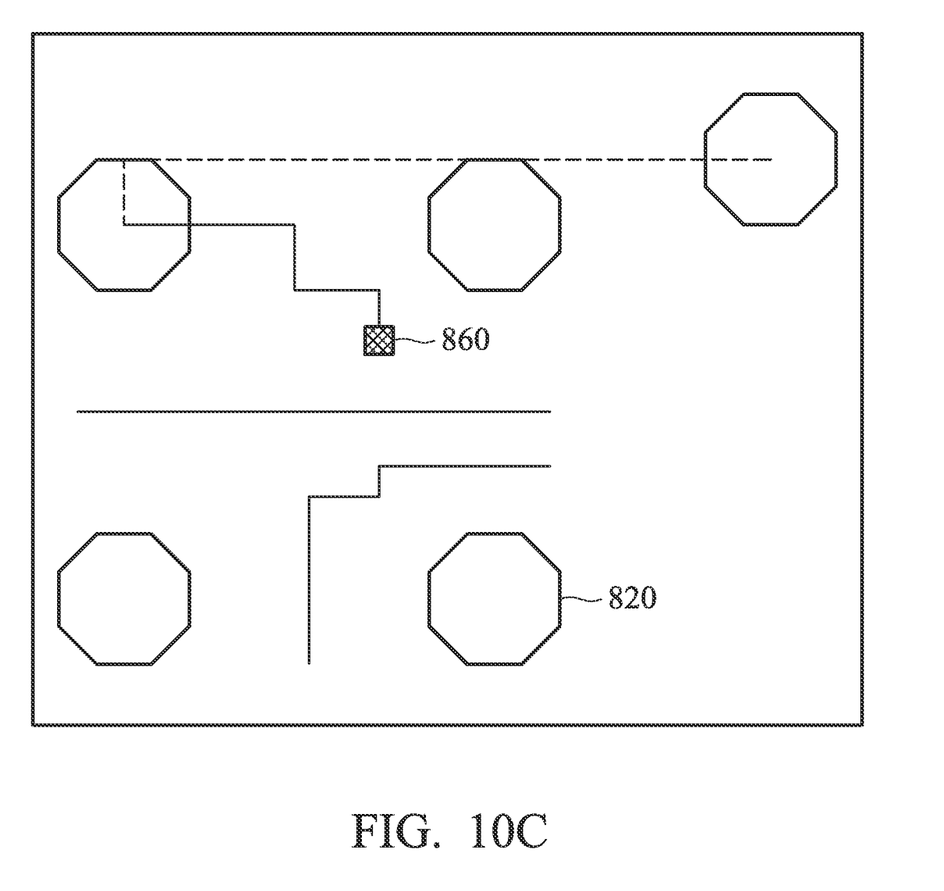

FIGS. 10A-10C shows a schematic illustrating a routing path refinement performed in step S730 of FIG. 7. In FIG. 10A, the number of wires on every VD edge are shown. Next, the processor separates the VD edges into independent RDL routes as shown in FIG. 10B. The RDL routing is treated as a channel routing in every tile. Since all the wire terminals to be on the tile boundary are restricted, every I/O pad 860 is projected on the tile boundary as a pseudo pad 1010 in FIG. 10B. Next, the processor uses the existing wire terminals on a tile boundary 1020 to define a sequence $S=<n_{1s}, n_{2s}, n_{2t}, n_{1t}, n_{3t}>$. In order to avoid wire crossings in the tile 1020, the pseudo pad 1010 must result in the sequence $S=<n_{1s}, n_{2s}, n_{2t}, n_{1t}, n_{3t}, n_{3s}>$. Thus, the I/O pads with other wires are considered. Therefore, any wire crossing can be prevented when it is handles the I/O pads and other wires independently. Finally, maze routing is applied to the interposer routing based on the bump assignment, and all wires can be routed without any wire congestion, as shown in FIG. 10C.

According to the embodiments, the chip-interposer routing and the micro-bump planning can simultaneously be handled for IR drops. Based on bump rules and power information of a flip-chip, the locations of micro bumps are analyzed to meet IR constraints. For a chip-interposer routing, the computational geometry techniques (e.g. Delaunay triangulation and Voronoi diagram) are applied to a flow network formulation for minimizing both IR drops and total wire-length. With the chip and interposer co-design flow, IR constraints can be met completely.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for co-designing a flip-chip and an interposer, comprising:
obtaining information regarding I/O pads, power pins and IR constraints of the flip-chip by a processor;
performing a bump planning procedure by the processor to obtain a minimum number of power bumps of the flip-chip corresponding to the power pins of the flip-chip according to the information, and to uniform power density of the power bumps of the flip-chip to obtain a minimum conductance of each of the power pins of the flip-chip and a bump placement of a plurality of micro bumps of the flip-chip;
performing a chip-interposer routing procedure by the processor to obtain a flow network according to the minimum conductance of the power pins and the bump placement of the micro bumps, and obtain a Re-Distribution Layer (RDL) routing of the flip-chip and an interposer routing of the interposer according to the flow network; and
mounting the flip-chip to the interposer according to the RDL routing of the flip-chip and the interposer routing of the interposer to obtain a chip-interposer structure, wherein a distance between a die boundary of the flip-chip and the micro bump adjacent to the die boundary of the flip-chip is not greater than half of a bump pitch of the micro bumps in the bump placement.

2. The method as claimed in claim 1, wherein the step of performing the bump planning procedure further comprises:
obtaining a total number of micro bumps of the flip-chip according to the minimum number of power bumps and number of signal bumps of the flip-chip corresponding to the I/O pads of the flip-chip,
wherein the total number of micro bumps is larger than a sum of the signal bumps and the power bumps of the flip-chip.

3. The method as claimed in claim 1, wherein the step of performing the bump planning procedure further comprises:
obtaining the bump placement of the micro bumps of the flip-chip according to the information and the uniformed power density of power bumps of the flip-chip, wherein the micro bumps are placed uniformly in the flip-chip.

4. The method as claimed in claim 3, wherein each of the power bumps has the same and maximum current in the flip-chip.

5. The method as claimed in claim 1, wherein the step of performing the bump planning procedure further comprises:

obtaining an equivalent conductance of each of the power pins according to distances between the power pin and the micro bumps in the bump placement; and obtaining the minimum conductance of each of the power pins according to the corresponding equivalent conductance and a minimum number of the power bumps of the flip-chip corresponding to the power pins of the flip-chip, wherein the equivalent conductance of each of the power pins is larger than the corresponding minimum conductance.

6. The method as claimed in claim 1, wherein the step of performing the chip-interposer routing procedure further comprises:

constructing the flow network according to the minimum conductance of the power pins;

obtaining a bump assignment of the power bumps of the flip-chip corresponding to the power pins of the flip-chip and signal bumps of the flip-chip corresponding to the signal pads of the flip-chip according to the flow network; and obtaining the RDL routing of the flip-chip according to the bump assignment.

7. The method as claimed in claim 6, wherein a total wire-length of the RDL routing is minimized.

8. The method as claimed in claim 6, wherein the step of performing the chip-interposer routing procedure further comprises:

modeling the IR constraints according to the RDL routing to prevent IR violations of the bump assignment; and obtaining the interposer routing according to the modeled IR constraints and the bump assignment.

9. A method for co-designing a plurality of flip-chips and an interposer, comprising:

obtaining information regarding I/O pads, power pins and IR constraints of each of the flip-chips by a processor;

obtaining a minimum number of power bumps of each of the flip-chips according to the corresponding information by the processor, respectively;

uniforming power density of the power bumps of each of the flip-chips by the processor to respectively obtain a minimum conductance of each of the power pins of the corresponding flip-chip and a bump placement of a plurality of micro bumps of the corresponding flip-chip;

constructing a flow network according to the minimum conductance of the power pins of each of the flip-chips and the corresponding bump placement of the micro bumps by the processor, respectively;

obtaining a bump assignment of the power bumps of each of the flip-chips according to all of the flow networks by the processor, respectively;

obtaining a Re-Distribution Layer (RDL) routing of each of the flip-chips according to the corresponding bump assignment by the processor, respectively;

obtaining an interposer routing of the interposer according to all of the RDL routings by the processor; and mounting the flip-chips to the interposer according to the RDL routing of each of the flip-chips and the interposer routing of the interposer to obtain a chip-interposer structure, wherein a distance between a die boundary of the flip-chip and the micro bump adjacent to the die boundary of the flip-chip is not greater than half of a bump pitch of the micro bumps in the bump placement.

10. The method as claimed in claim 9, further comprising:

obtaining a total number of micro bumps of each of the flip-chips according to the minimum number of power bumps and number of signal bumps of the corresponding flip-chip, respectively, wherein the total number of micro bumps of the flip-chip is larger than a sum of the signal bumps and the power bumps of the flip-chip.

11. The method as claimed in claim 9, further comprising:

obtaining the bump placement of the micro bumps of each of the flip-chips according to the corresponding information and the uniformed power density of power bumps of the corresponding flip-chip, wherein the micro bumps are placed uniformly in the corresponding flip-chip.

12. The method as claimed in claim 11, wherein each of the power bumps has the same and maximum current in each of the flip-chips.

13. The method as claimed in claim 9, further comprising:

obtaining an equivalent conductance of each of the power pins according to distances between the power pin and the micro bumps in the bump placement of each of the flip-chips, respectively; and obtaining the minimum conductance of each of the power pins according to the corresponding equivalent conductance and a minimum number of the power bumps of each of the flip-chips, respectively, wherein the equivalent conductance of each of the power pins is larger than the corresponding minimum conductance in each of the flip-chips.

14. The method as claimed in claim 9, further comprising:

determining whether the RDL routing of each of the flip-chips has routing congestion or wire crossings; and changing the corresponding bump assignment of the flip-chip when it is determined that the RDL routing of the flip-chip has routing congestion or wire crossings.

15. The method as claimed in claim 14, wherein a total wire-length of the RDL routing is minimized for each of the flip-chips.

16. The method as claimed in claim 9, further comprising:

modeling the IR constraints according to the RDL routing of each of the flip-chips to prevent IR violations of the bump assignments; and obtaining the interposer routing according to the modeled IR constraints and the bump assignments of all of the flip-chips.

* * * * *